No. 627,548. Patented June 27, 1899.
C. E. VAIL.
BICYCLE SADDLE CARRIAGE.
(Application filed May 18, 1898.)
(No Model.) 2 Sheets—Sheet 1.
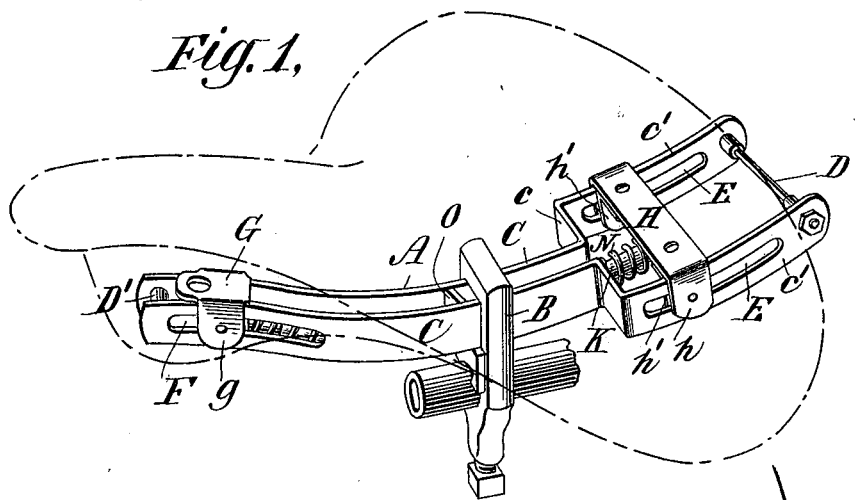
Fig. 1,
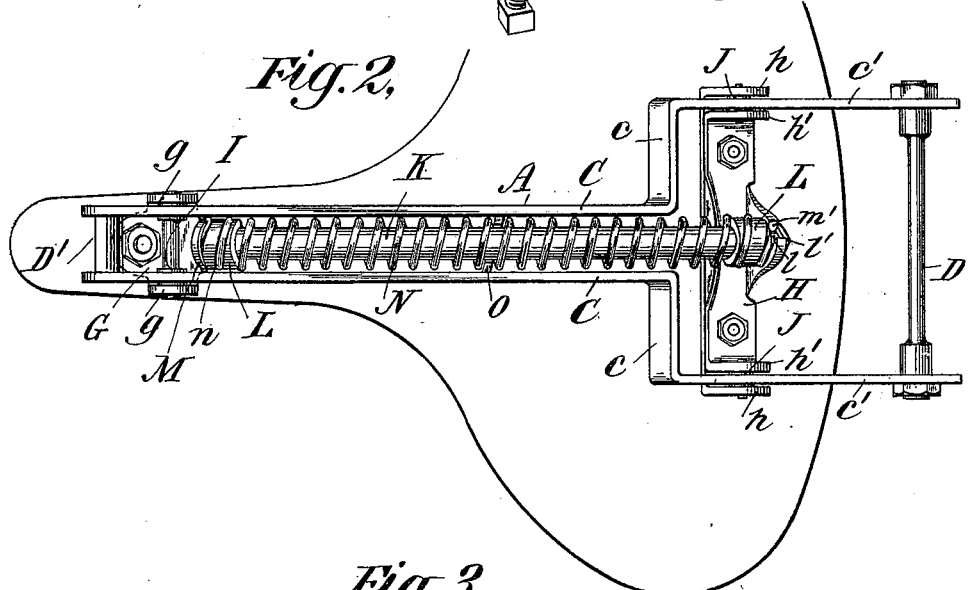
Fig. 2,
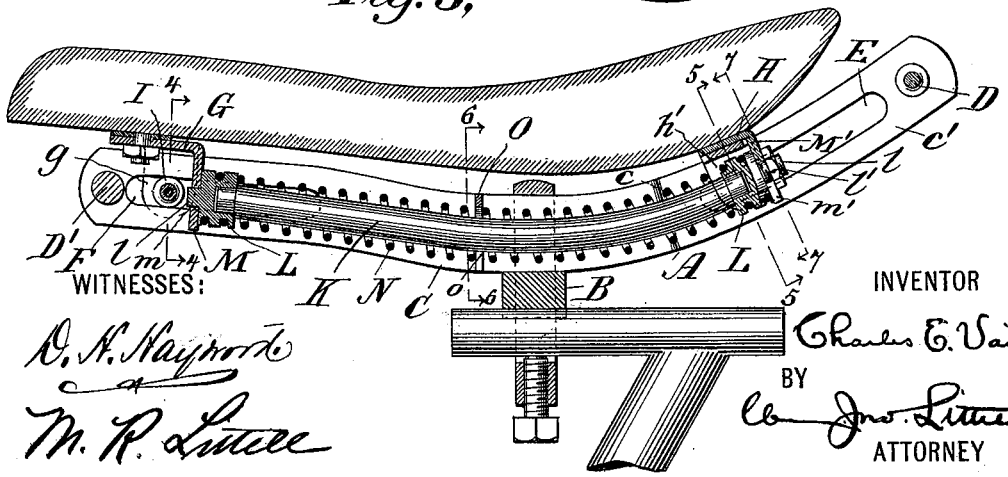
Fig. 3,
WITNESSES:
D. N. Hayword
M. R. Littell
INVENTOR
Charles E. Vail,
BY
Jno. Littell
ATTORNEY
THE NORRIS PETERS CO., PHOTO-LITHO., WASHINGTON, D. C.

No. 627,548. Patented June 27, 1899.
C. E. VAIL.
BICYCLE SADDLE CARRIAGE.
(Application filed May 18, 1898.)
(No Model.) 2 Sheets—Sheet 2.
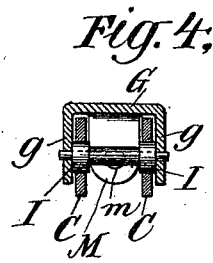
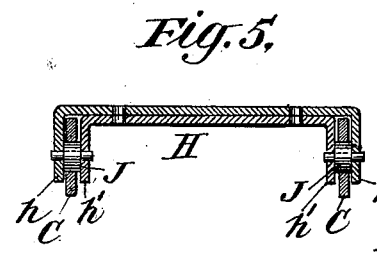
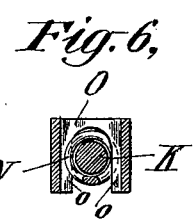
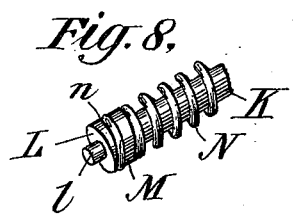
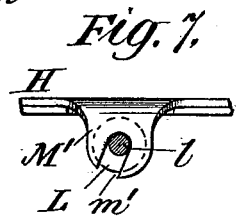
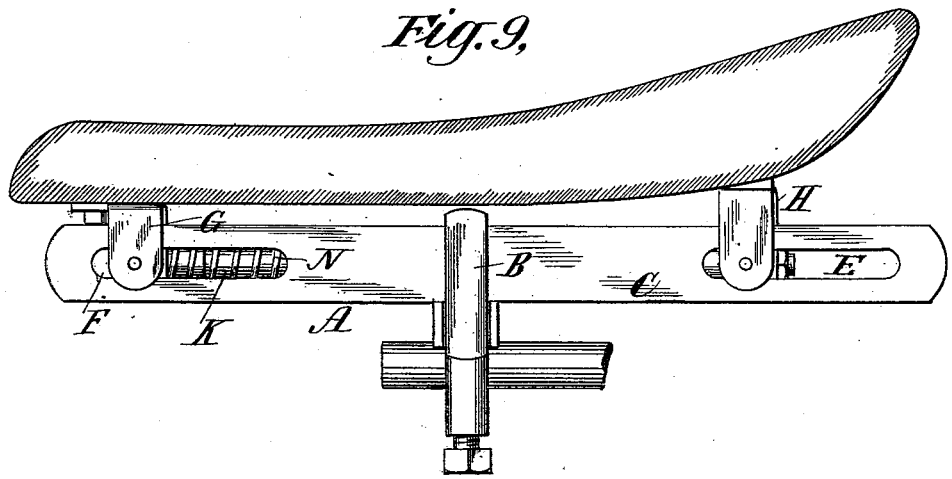
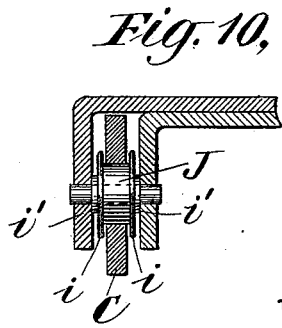
WITNESSES:
INVENTOR
BY
ATTORNEY
THE NORRIS PETERS CO., PHOTO-LITHO., WASHINGTON, D. C.

UNITED STATES PATENT OFFICE.

CHARLES E. VAIL, OF SALT LAKE CITY, UTAH.

BICYCLE SADDLE-CARRIAGE.

SPECIFICATION forming part of Letters Patent No. 627,548, dated June 27, 1899.

Application filed May 18, 1898. Serial No. 681,018. (No model.)

*To all whom it may concern:*

Be it known that I, CHARLES E. VAIL, a citizen of the United States, residing at Salt Lake City, in the county of Salt Lake and State of Utah, have invented certain new and useful Improvements in Bicycle Saddle-Carriages; and I do hereby declare that the following is a full, clear, and exact description of the invention, which will enable others skilled in the art to which it appertains to make and use the same.

This invention relates to bicycle saddle-carriages of that class which are designed to impart a forward and rearward yielding movement to the saddle; and it has for its object to provide a simple and improved device of this character which will automatically act to insure a uniform seat under varying conditions, ease and comfort to the rider, and which will serve as a cushion to relieve both the bicycle and rider from the jar and concussion incident to travel over obstructions or rough surfaces.

A further object of my invention is to produce a bicycle saddle-carriage in which the friction is reduced to a minimum, whereby ease of operation and effectiveness are enhanced.

In the drawings, Figure 1 is a perspective view of a bicycle saddle-carriage embodying my invention, the saddle being shown in dotted lines. Fig. 2 is a bottom or inverted plan view, the clamp for attaching the carriage to the saddle-post being removed. Fig. 3 is a vertical longitudinal sectional view taken centrally through the saddle and carriage. Fig. 4 is a vertical transverse sectional view taken on the line 1 1 Fig. 3. Fig. 5 is a similar view taken on the line 2 2, Fig. 3. Fig. 6 is a similar view taken on the line 3 3, Fig. 3. Fig. 7 is a similar view taken on the line 4 4, Fig. 3. Fig. 8 is a detail perspective view of one end of the guide-rod and spring and showing the manner of attaching and detaching the retaining-sleeve. Fig. 9 is a side elevation illustrating a modification. Fig. 10 is a detail sectional view illustrating another modification.

Corresponding parts in the figures are denoted by the same letters of reference.

Referring to the drawings, A designates the stationary frame of the carriage, which is provided with a clamp B or other suitable form of clamp for attaching the carriage to a straight or T form of saddle-post. The frame A comprises two side bars C C, preferably formed from strip-steel, and extend parallel from their forward ends for about two-thirds their length. At this point the side bars are turned outwardly at right angles, as at $c c$, and thence again inwardly, as at $c' c'$, the rear portions of the side bars being parallel, but located a greater distance apart than the forward portions, whereby the weight upon the frame is more evenly sustained. The bars are connected at their forward and rear ends, respectively, by coupling-bars D D'.

The rear portions of the side bars C (approximately one-half their length) are curved upwardly, the purpose of which will hereinafter appear, and near the upturned ends are provided coincident longitudinal bearing-slots E E, one in each bar. The forward sections of the bars may be either slightly downturned, as shown, or straight, and near their ends they are provided with longitudinal bearing-slots F F, corresponding to the slots E.

The yielding or sliding part of the carriage comprises a forward member G and a rear member H. These members may be connected to the saddle in any suitable manner, the means employed being adapted to the construction of saddle. It will be understood that the pattern of saddle is non-essential to my invention; but in the drawings I have illustrated one form thereof, which is bolted directly to the members G and H, as shown.

The member G is provided with two depending parallel arms $g g$, between which work the forward portions of the bars C, said arms carrying a bearing-roller I, which registers with and works in the bearing-slots F. The member H is also provided with depending arms $h h$ similar to the arms $g$ and which loosely embrace the rear sections of the bars C, and at the inner side of the latter the member H is provided with two additional depending arms $h' h'$, coinciding with the arms $h$ and forming intervening channels within which the respective bars B work.
Journaled within these channels and working in the bearing-slots E are bearing-rollers J J.

Disposed between the bars C is a guide-rod K, having its ends seated in retaining-sleeves L L, the latter being secured to arms M M', depending, respectively, from the members G and H. The sleeves L are recessed at their inner ends, and within said recesses loosely fit the opposing reduced ends of the guide-rod. The outer ends of the sleeves are provided with studs $l$ $l$, the one upon the forward sleeve fitting in an eye $m$ in the arm M. The stud of the rear sleeve is screw-threaded and is received by a slot $m'$ in the arm M' and is adapted to be removed therefrom for the purpose hereinafter set forth. A binding-nut $l'$ is mounted on the stud of said rear sleeve L to bind the latter to the arm M'.

Mounted upon the guide-rod K is a coil-spring N, which is designed to control the movement of the saddle. The spring is attached at its ends to the sleeves L, and to this purpose said sleeves are each provided with a spiral groove $n$, conforming to and adapted to receive the coils of the spring. By reason of this construction it will be apparent that in order to remove the spring for purpose of substitution it is but necessary to loosen the nut $l'$, when the guide-rod K, together with the spring and sleeves, may be detached. The sleeves can then be unscrewed from the spring and the latter slipped from the guide-rod. To insert a spring, a reverse operation is all that is necessary.

The function of the spring N is controlled by an inverted-U-shaped plate O, which is secured between the side bars C at approximately midway their length, said plate being arranged slightly obliquely to coincide with the coils of the spring. The guide-rod K is received within the recess of the plate O, the sides of the latter forming flanges $o$ $o$, which fit between the coils of the spring. It will thus be seen that in the movement of the saddle in either direction the tension of the spring is utilized both by draft and compression. For example, as the saddle moves rearwardly the section of the spring to the front of the plate O is compressed, while the section to the rear thereof is drawn upon, and in the return of the saddle the function of the spring is reversed. It will also be apparent that the relative positions of the movable and stationary parts of the carriage can be regulated to suit the convenience of the rider by adjustment of the spring in its relation to the plate O. This is accomplished by adjusting the sliding section of the carriage (when the spring is disconnected from the plate O) to the desired position in its relation to the stationary frame and then replacing the spring, with the coincident coils engaging said plate.

The operation and advantages of my invention will be readily understood by those skilled in the art to which it appertains. When the saddle is at rest, the sliding section of the carriage occupies a position with its roller-bearings forward of the center of the guide-slots. In the operation of propelling the bicycle the saddle is forced rearwardly and the rear part of the saddle upwardly against the tension of the spring, the latter acting to return the saddle downwardly and forwardly as the pressure upon the saddle is lessened. Thus any variation in pressure upon the saddle through the operation of propelling or in the passage of the bicycle over rough surfaces is automatically compensated for, and comfort to the rider and the minimum wear upon the bicycle are secured.

It will be obvious that by reason of the upward rear movement of the saddle the greater the pressure upon the pedals of the bicycle the higher the saddle rides to the rear, thereby providing a more secure as well as a more comfortable seat to the rider. Thus the tendency to slip from the saddle in exerting great propelling power and in riding up grades is entirely overcome, the upward movement of the rear of the saddle insuring a uniform seat under all varying conditions. It will be further obvious that by reason of the use of roller-bearings the friction between the movable and stationary parts of the carriage is reduced to a minimum, and as the bearings require but little, if any, lubricant accumulation of dust and grit in the working parts is avoided.

By reason of the method of mounting the controlling-spring the latter may be readily removed for substitution of a new spring or one of greater or less strength, as may be best suited to the requirements of the rider.

I do not wish to be understood as limiting myself to the precise construction of parts as herein shown and described, but reserve to myself the right to all such modifications as properly fall within the spirit and scope of my invention. For instance, if desired the bars C may be made straight throughout their length in lieu of the curved construction. (See Fig. 9.)

In Fig. 10 I have shown a modified form of the bearing-rollers L, in which the rollers are provided with peripheral flanges $i$ $i$, between which are received the bars C, and thus prevent contact of the latter with the arms between which they pass. The rollers may also be provided with hubs $i'$ $i'$, as shown, which prevent frictional contact of the rollers with the plates between which they are journaled. It will be understood that these modifications of the rollers I may also be applied to the roller J.

I claim as my invention—

1. In a bicycle saddle-carriage, the combination, with a stationary section comprising two side bars provided near their longitudinal centers with opposing flanges, of a yielding section carrying a removable guide-rod received between said flanges, a sleeve disposed on each end of the rod and secured to the yielding section of the carriage, and a coil-spring encircling the guide-rod and having its ends secured to said sleeves, said flanges being received between the two adjacent coils of the spring; substantially as and for the purpose set forth.

2. In a bicycle saddle-carriage, the combination, with a stationary section, of a yielding section provided with two depending plates one of which has an eye and the other an open slot, a guide-rod disposed between said plates, coupling-sleeves mounted on the ends of said guide-rod, the forward sleeve being provided with a stud fitting in the eye of the forward plate, and the rear sleeve provided with a threaded stud adapted to be secured in the slot of the rear plate by a nut, a coil-spring mounted on said guide-rod and having its ends secured to the sleeves, and means carried by the stationary section for engaging with the coils of the spring; substantially as set forth.

3. A bicycle saddle-carriage comprising a section provided near its forward end with guideways, the latter being arranged in a plane approximately parallel with the line of travel of the bicycle, said section being further provided near its rear end with guideways extending upwardly in a rearward direction and at an angle to the line of travel and to the forward guideways, and a second section provided with bearings received by said guideways; substantially as and for the purpose set forth.

4. A bicycle saddle-carriage comprising a section provided near its forward end with approximately horizontally arranged guideways, and near its rear end with guideways extending upwardly and rearwardly, a second section provided with bearings loosely received by said guideways, and a spring for controlling the movement of the first section in both a rearward and forward direction; substantially as set forth.

5. A bicycle saddle-carriage comprising a stationary section provided near its forward ends with guide-slots and near its rear ends with upwardly-curved guide-slots, a yielding section carrying bearing-rollers working in said guide-slots, and a spring for controlling the movement of said yielding section in both a rearward and forward direction; substantially as set forth.

In testimony whereof I affix my signature in presence of two witnesses.

CHARLES E. VAIL.

Witnesses:
  WM. JNO. LITTELL,
  MATILDA R. LITTELL.